United States Patent Office 2,837,318
Patented June 3, 1958

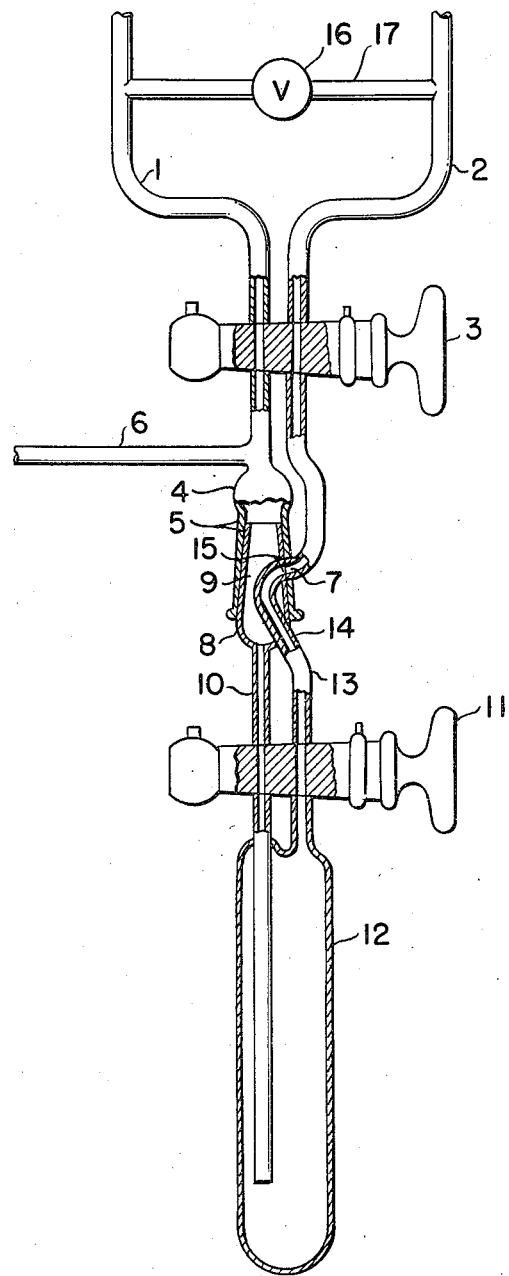

2,837,318

CONDENSATION TRAP

Paul F. Winternitz and Arrigo A. Carotti, New York, N. Y., assignors, by mesne assignments, to Olin Mathieson Chemical Corporation, a corporation of Virginia Application March 28, 1956, Serial No. 574,472

2 Claims. (Cl. 257—29)

This invention relates to condensation traps for the fractional condensation of vapors and in particular to a condensation trap which can be disconnected from a line carrying a flowing stream of a mixture of gases or vapors without disturbing the flow of the gas or vapor stream.

In fractionally condensing a stream of flowing gases or vapors in laboratory or other apparatus, it is conventional to employ a plurality of condensation traps connected in series along the line carrying the vapor stream to form what is known as a trap train. Each condensation trap can be cooled to a particular temperature so that vapors condensing at that temperature will condense out into the particular trap. In these conventional trap train assemblies, the condensation traps are ordinarily not removable from the assembly or detachable from the vapor line when the stream is flowing, particularly under vacuum or pressure, so that it is necessary to stop the vapor flow in order to remove a trap. A novel condensation trap has now been devised, however, which is removable from the vapor line without disturbing the flow of vapors and which permits fractional condensation of vapors from a continuously flowing stream when used in a train assembly with similar traps.

The novel condensation trap of this invention comprises a conventional trap connected to a vapor line through and by means of a unique male-female joint providing for separate passage of two gas streams through the joint in association with closure means positioned above and below the joint for controlling flow of each of the gas streams.

More specifically, the novel condensation trap of this invention comprises in combination upper and lower sections detachably joined together by means of a male-female joint. The upper section includes conduits for entering and exiting vapors adapted to be connected to the vapor line, the inlet vapor conduit terminating in an opening in the upper portion of the female member of the male-female joint and the exit vapor conduit terminating in an opening in the side wall of the female member. Closure means such as a stop-cock is positioned between the vapor line and the female member for controlling vapor flow in the conduits. The lower section includes the male member of the male-female joint which is connected by conduits to an elongated enclosed chamber. The male member encloses an inlet vapor passage and an exit vapor passage in which the upper end of the inlet vapor passage opens into the upper portion of the male member and the upper end of the exit vapor passage opens into the side wall of the male-member, the two passages being so positioned with respect to the openings of the inlet and exit vapor conduits in the upper portion and sidewall respectively of the female member that two separate and continuous vapor passages are provided through the male-female joint in closed position The lower end of the exit vapor passage in the male member connects with a second exit vapor conduit depending from the male member and opening into the upper portion of the elongated enclosed chamber. The inlet vapor passage in the male member connects at its lower end with a second inlet conduit which enters the upper portion of the elongated enclosed chamber and discharges into the lower portion of the chamber. A second closure means is positioned between the male member and the chamber for controlling vapor flow in the conduits.

The novel condensation trap has several distinct advantages over conventional condensation traps in addition to or arising from its ability to be cut-off or removed from the assembly or vapor line. For example, when one trap in an assembly becomes full, it may be replaced without disturbing operations. Also the novel trap permits intermittent withdrawal and study of samples from a continuously flowing vapor stream so that the conditions of the reaction producing the vapor stream may be altered in accordance therewith. In addition the novel trap permits removal of toxic or flammable materials from a vapor or gas system with complete safety and without contaminating the trap contents or the material remaining in the system. The trap is simple and inexpensively constructed, liquids are easily removed therefrom, and it is easily cleaned.

The condensation trap of this invention will now be described in connection with the accompanying drawing. Numeral 1 represents an inlet vapor conduit and numeral 2 represents an exit vapor conduit. Conduit 1 passes through the corresponding opening in stop-cock 3 and connects with the upper portion of female member 4 of the male-female joint 5. Side arm 6 connects the upper portion of female member 4 with a manometer (not shown). Conduit 2, also passing through stop-cock 3 is connected to the sidewall of female member 4 providing opening 7. Male member 8 of male-female joint 5 encloses passageway 9 leading to conduit 10 which passes through stop-cock 11 and into chamber 12. Conduit 13 extending from chamber 12 and passing through stop-cock 11 connects with passage 14 in male member 8. Passage 14 opens into the sidewall of male member 8 at opening 15 opposite opening 7 in female member 4.

In operation valve 16 in line 17 is closed and stop-cocks 3 and 11 are open as shown. Vapors pass downwardly through conduit 1, stop-cock 3, pasage 9, conduit 10 and stop-cock 11 to chamber 12. Uncondensed vapors then pass upwardly through conduit 13, passage 14, openings 15 and 7, conduit 2 and stop-cock 3.

The trap may be removed from the system by opening valve 16, closing stop-cocks 3 and 11, and breaking the seal at male-female joint 5. Another trap may then be put into the place of the one removed.

The novel trap of this invention is especially useful for carrying out laboratory scale operations, and for this purpose it can be fabricated from glass with the joints being ground glass. For use with pressure or high-vacuum equipment, advantageously for safety reasons the male-female joint is mercury sealed as are the stop-cocks. The mercury sealed stop-cocks can be replaced with high-vacuum stop-cocks if desired.

We claim:

1. A male-female joint characterized by two separate passages through the joint which passages are simultaneously broken when the joint is opened which comprises a hollow elongated tapered female member having an opening at the wider end, an opening at the narrower end and an opening in a sidewall, a hollow tube connected to the sidewall of the female member from without and enclosing the opening in the sidewall of the female member, a hollow elongated tapered male member sized to be inserted into the opening at the wider end of the female member and to fit tightly therein, the male member having an opening at the wider end, an opening at the narrower end and an opening in a sidewall positioned opposite the opening in the sidewall of the female member when the male member and the female member are placed in juxtaposition, a hollow tube within the male member connected with and enclosing the opening in the sidewall of the male member and extending and connected with and enclosing a second opening in the sidewall of the male member, the second opening being positioned so that it is not closed by the sidewall of the female member when the male member and female member are placed in juxtaposition, and a hollow tube connected to the sidewall of the male member from without and enclosing the second opening in the sidewall of the male member.

2. A condensation trap which comprises an elongated enclosed chamber having an inlet vapor conduit extending from the upper portion and discharging within the lower portion of the elongated enclosed chamber and an exit vapor conduit extending from the upper portion of the elongated enclosed chamber, the inlet vapor conduit and exit vapor conduit being separately connected to a vapor line containing a flowing vapor stream by means of a male-female joint characterized by two separate passages through the joint which passages are simultaneously broken when the joint is opened including a hollow elongated tapered female member having an opening at the wider end, an opening at the narrower end and an opening in a sidewall, fluid connecting means between the vapor line and the opening at the narrower end of the female member, a hollow tube connected to the sidewall of the female member from without and enclosing the opening in the sidewall of the female member, fluid connecting means between the vapor line and the hollow tube connected to the sidewall of the female member from without, a hollow elongated tapered male member sized to be inserted into the opening at the wider end of the female member and to fit tightly therein, the male member having an opening at the wider end, an opening at the narrower end and an opening in a sidewall positioned opposite the opening in the sidewall of the female member when the male member and the female member are placed in juxtaposition, fluid connecting means between the opening at the wider end of the male member and the inlet vapor conduit extending from the elongated enclosed chamber, a hollow tube within the male member connected to the sidewall of the male member and enclosing the opening in the sidewall member and connected to and enclosing a second opening in the sidewall of the male member which is positioned so that it is not closed by the sidewall of the female member when the male member and female member are placed in juxtaposition, a hollow tube connected to the sidewall of the male member from without and enclosing the second opening in the sidewall of the male member, fluid connecting means between the hollow tube connected to the sidewall of the male member from without and the exit vapor conduit extending from the upper portion of the elongated enclosed chamber, whereby a continuous inlet vapor passage is provided between the vapor line and the elongated enclosed chamber and a separate continuous exit vapor passage is provided between the vapor line and the elongated enclosed chamber when the male-female joint is placed in juxtaposition, closure means for the inlet vapor conduit and the exit vapor conduit positioned between the vapor line and the female member, and closure means for the inlet vapor conduit and the exit vapor conduits positioned between the elongated enclosed chamber and the male member.

References Cited in the file of this patent

UNITED STATES PATENTS

| | | |
|---|---|---|
| 806,935 | Straus et al. | Dec. 12, 1905 |
| 2,096,591 | Panagopoulos | Oct. 19, 1937 |